US011243407B2

(12) United States Patent
Chen et al.

(10) Patent No.: US 11,243,407 B2
(45) Date of Patent: Feb. 8, 2022

(54) ILLUMINATION SYSTEM AND PROJECTION APPARATUS

(71) Applicant: Coretronic Corporation, Hsin-Chu (TW)

(72) Inventors: Yu-Shan Chen, Hsin-Chu (TW); Ko-Shun Chen, Hsin-Chu (TW); Ming-Tsung Weng, Hsin-Chu (TW); Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 120 days.

(21) Appl. No.: 16/701,165

(22) Filed: Dec. 3, 2019

(65) Prior Publication Data

US 2020/0192114 A1  Jun. 18, 2020

(30) Foreign Application Priority Data

Dec. 13, 2018 (CN) ............................ 201822089144

(51) Int. Cl.
| | |
|---|---|
| *G03B 21/20* | (2006.01) |
| *G02B 27/48* | (2006.01) |
| *G02B 27/18* | (2006.01) |
| *G02B 5/02* | (2006.01) |
| *G02B 27/10* | (2006.01) |
| *G02B 26/00* | (2006.01) |

(52) U.S. Cl.
CPC ............. *G02B 27/48* (2013.01); *G02B 5/021* (2013.01); *G02B 5/0215* (2013.01); *G02B 26/008* (2013.01); *G02B 27/1006* (2013.01); *G02B 27/18* (2013.01); *G03B 21/204* (2013.01); *G03B 21/2013* (2013.01)

(58) Field of Classification Search
CPC .............. G03B 21/204; G03B 21/2013; G03B 21/2033; G02B 27/48; G02B 5/021
See application file for complete search history.

(56) References Cited

U.S. PATENT DOCUMENTS

| | | | |
|---|---|---|---|
| 2009/0185141 A1 | 7/2009 | Chen et al. | |
| 2009/0268168 A1* | 10/2009 | Wang | G03B 21/2066 353/37 |
| 2018/0095268 A1* | 4/2018 | Pastri | G02B 19/0047 |
| 2020/0103736 A1* | 4/2020 | Kurosaki | G02B 3/06 |

* cited by examiner

*Primary Examiner* — Ryan D Howard
(74) *Attorney, Agent, or Firm* — JCIPRNET (57) ABSTRACT

An illumination system is configured to provide an illumination beam. The illumination system includes at least one light source, a composite unit and an actuator. The at least one light source is configured to provide at least one light beam. The composite unit includes a diffusion surface and an optical surface opposite to each other, wherein the composite unit is disposed on a transmission path of the at least one light beam and configured to enable the at least one light beam to pass through. The actuator is connected to the composite unit for driving the composite unit to move along at least one direction, and the at least one direction is perpendicular to a normal direction of a plane on which the composite unit is located. A projection apparatus including the illumination system is also provided.

16 Claims, 11 Drawing Sheets

ILLUMINATION SYSTEM AND PROJECTION APPARATUS

CROSS-REFERENCE TO RELATED APPLICATION

This application claims the priority benefit of Chinese application serial no. 201822089144.5, filed on Dec. 13, 2018. The entirety of the above-mentioned patent application is hereby incorporated by reference herein and made a part of this specification.

BACKGROUND

Technical Field

The invention relates to an optical system and an optical apparatus, and more particularly relates to an illumination system and a projection apparatus.

Description of Related Art

A projection apparatus is a display apparatus for generating a large-sized image, and has consistently been making progress with evolution and innovation of technology. Imaging principle of the projection apparatus is to convert an illumination beam generated by an illumination system into an image beam via a light valve, and then project the image beam onto a projection target (for example, a screen or a wall surface) through a projection lens, so as to form a projection image.

In addition, following the market demands on brightness, color saturation, service life, and green environmental protection requirements for the projection apparatus, a light source of the illumination system has also evolved from an ultra-high-performance lamp (UHP lamp) or light-emitting diode (LED) all the way to the most advance laser diode (LD). However, in the illumination system, a current cost-effective approach for generating red and green lights is to use a blue laser diode to excite fluorescent powders of a fluorescent color wheel to generate a yellow green light, and then use an optical component to filter out the desired red light or green light for use.

However, in the known architecture of the conventional illumination system, the light source generating by the laser diode needs to be expanded by using a plurality of sets of lenses for imaging, so as to obtain a beam angle close to that of the yellow green light emitted by the fluorescent color wheel and to provide image uniformity. Thus, it causes the illumination system to be difficult in volume reduction and have a high cost. In addition, the light source adopting the laser diode is prone to produce speckle phenomenon on the imaging, thus causing a reduction in optical imaging quality. Therefore, in the known architecture of the conventional illumination system, a diffuser or a diffusion structure for alleviating the speckle phenomenon is combined into the light filtering color wheel to diffuse the laser beam. But this approach also causes the illumination system to be enlarged in volume and increased in the cost. Moreover, being configured with more than two color wheels means that it requires also more than two sets of corresponding components, such as motor units, drive modules, circuits and the like. As a result, in addition to the problem of high cost and difficult volume reduction, there are also problems of heat dissipation and noise.

The information disclosed in this "Description of Related Art" section is only for enhancement of understanding of the Related Art of the described technology and therefore it may contain information that does not form the prior art that is already known to a person of ordinary skill in the art. Further, the information disclosed in this "Description of Related Art" section does not mean that one or more problems to be resolved by one or more embodiments of the invention was acknowledged by a person of ordinary skill in the art.

SUMMARY

The invention provides an illumination system and a projection apparatus, which can avoid speckle phenomenon of a light beam while enabling the system to be reduced in volume and lowered in cost.

Other features and advantages of the invention can be further understood by the technical features disclosed in the invention.

To achieve one, part, or all of the objectives aforementioned or other objectives, one embodiment of the invention provides an illumination system configured to provide an illumination beam. The illumination system includes at least one light source, a composite unit and an actuator. The at least one light source is configured to provide at least one light beam. The composite unit includes a diffusion surface and an optical surface opposite to each other, wherein the composite unit is disposed on a transmission path of the at least one light beam and configured to enable the at least one light beam to pass through. The actuator is connected to the composite unit for driving the composite unit to move along at least one direction, and the at least one direction is perpendicular to a normal direction of a plane on which the composite unit is located.

To achieve one, part, or all of the objectives aforementioned or other objectives, another embodiment of the invention provides a projection apparatus configured to provide a projection beam. The projection apparatus includes an illumination system, at least one light valve and a lens module. The illumination system is configured to provide an illumination beam. The illumination system includes at least one light source, a composite unit and an actuator. The at least one light source is configured to provide at least one light beam. The composite unit includes a diffusion surface and an optical surface opposite to each other, wherein the composite unit is disposed on a transmission path of the at least one light beam and configured to enable the at least one light beam to pass through. The actuator is connected to the composite unit. The at least one light valve is disposed on a transmission path of the illumination beam for converting the illumination beam into at least one image beam. The lens module is disposed on a transmission path of the at least one image beam for converting the at least one image beam into a projection beam, wherein the actuator is configured to drive the composite unit to move along at least one direction, and the at least one direction is perpendicular to a normal direction of a plane on which the composite unit is located.

Based on the above, the embodiments of the invention achieve at least one of the following advantages or effects. In the projection apparatus of the invention, the composite unit of the illumination system is disposed on the transmission path of the light beam, and a diffusion effect of the light beam is produced on the diffusion surface in the composite unit via the actuation of the actuator. As a result, speckle phenomenon of the light beam can be reduced by the composite unit without additionally requiring a color wheel device, and thereby improves an optical quality while reducing the system volume and lowering the costs.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
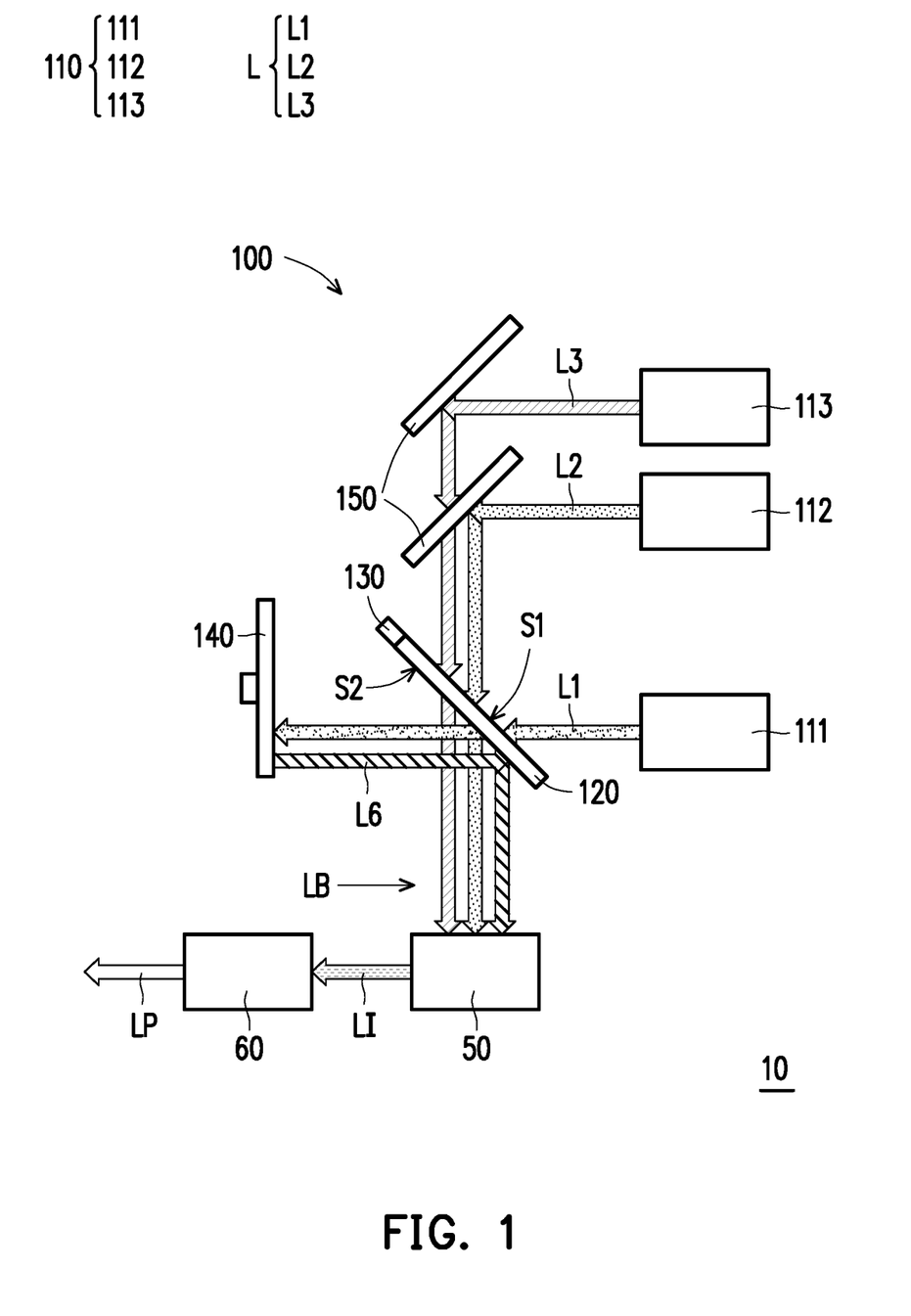
FIG. 1 is a schematic view illustrating a projection apparatus according to an embodiment of the invention.

FIG. 1 is a schematic view illustrating a projection apparatus according to an embodiment of the invention. Referring to FIG. 1, in the present embodiment, the projection apparatus 10 is configured to provide a projection beam LP. Specifically, the projection apparatus 10 includes an illumination system 100, at least one light valve 50 and a lens module 60. The illumination system 100 is configured to provide an illumination beam LB. The light valve 50 is disposed on a transmission path of the illumination beam LB for converting the illumination beam LB into at least one image beam LI. In other words, the illumination beam LB is referred to a light beam that the illumination system 100 provides to the light valve 50 at any time. In the present embodiment, the illumination beam LB is, for example, a blue light beam L2 provided from the blue light source 112, a supplementary light beam L3 provided from the supplementary light source 113 and an exited beam L6 converted by the wavelength conversion device 140, or a combination thereof. The lens module 60 is disposed on a transmission path of the image beam LI for converting the image beam LI into the projection beam LP, and the projection beam LP is configured to be projected onto a projection target (not shown), such as a screen or a wall surface.

In the present embodiment, the light valve 50 is, for example, a reflective light modulator, such as a liquid crystal on silicon panel (LCoS panel), a digital micro-mirror device (DMD) and so forth. In some embodiments, the light valve 50 may also be a transmissive light modulator, such as a transparent liquid crystal panel, an electro-optical modulator, a maganeto-optic modulator, an acousto-optic modulator (AOM) and so forth. The invention does not limit the type of the light valve 50. Teachings, suggestions and implementation instructions regarding detailed steps and embodiments of a method for the light valve 50 to convert the illumination beam LB into the image beam LI can be adequately acquired from the general knowledge in the art, and thus will not be described herein. In the present embodiment, the number of the light valve 50 may be one to three, teachings, suggestions and implementation instructions regarding detailed steps and embodiments corresponding to different numbers of light valves 50 can be adequately acquired from the general knowledge in the art, and thus will also not be described, but the invention is not limited thereto.

The projection lens 60, for example, includes a combination of one or more optical lenses having diopter, such as including various combinations of non-planar lenses which include a biconcave lens, a biconvex lens, a concave-convex lens, a convex-concave lens, a plano-convex lens, a plano-concave lens and so forth. In one embodiment, the projection lens 60 may also include a planar optical lens for projecting the image beam LI from the light valve 50 to the projection target in a reflective or transmissive manner. However, the invention does not limit the type of the projection lens 60.

In the projection apparatus 10 of the present embodiment, optical components, such as a beam homogenizer, a beam condenser, a beam splitter and a reflective element (not shown), may selectively be included for beam focusing, beam expansion, changing the transmission path and so forth, but the invention is not limited thereto. Teachings, suggestions and implementation instructions regarding detailed steps and embodiments of those elements can be adequately acquired from the general knowledge in the art, and thus will not be described herein.

The illumination system 100 includes at least one light source 110, a composite unit 120 and an actuator 130. In the present embodiment, the illumination system 100 further includes a wavelength conversion device 140 and a plurality of beam splitters 150. The light source 110 is configured to provide at least one light beam L. Specifically, in the present embodiment, the light source 110 includes an excitation light source 111, a blue light source 112 and a supplementary light source 113, wherein the excitation light source 111 provides an excitation beam L1, the blue light source 112 provides a blue light beam L2, and the supplementary light source 113 provides a supplementary light beam L3, wherein the excitation beam L1 is a blue light, and the supplementary light beam L3 is a red light. The at least one light beam L includes the excitation beam L1, the blue light beam L2, and the supplementary light beam L3, but the invention is not limited thereto.

In the present embodiment, the excitation light source 111, the blue light source 112 and the supplementary light source 113 are laser diodes (LDs); however, in other embodiments, the excitation light source 111, the blue light source 112 and the supplementary light source 113 may be light-emitting diodes (LEDs) or organic light-emitting diodes (OLEDs), but the invention does not limit the forms and the types of the excitation light source 111, the blue light source 112, the supplementary light source 113, and other light sources in the subsequent descriptions.

In the present embodiment, the number of the beam splitters 150 is two, and the beam splitters 150 are respectively disposed on a transmission path of the supplementary light beam L3 having the red light and a transmission path of the blue light beam L2. The beam splitter 150 (first beam splitter) disposed on the transmission path of the supplementary light beam L3 is configured to reflect the red light or be replaced by a reflective mirror, and the beam splitter 150 (second beam splitter) disposed on the transmission path of the blue light beam L2 is configured to reflect the blue light and enable the red light to pass through.

Figure 2A:
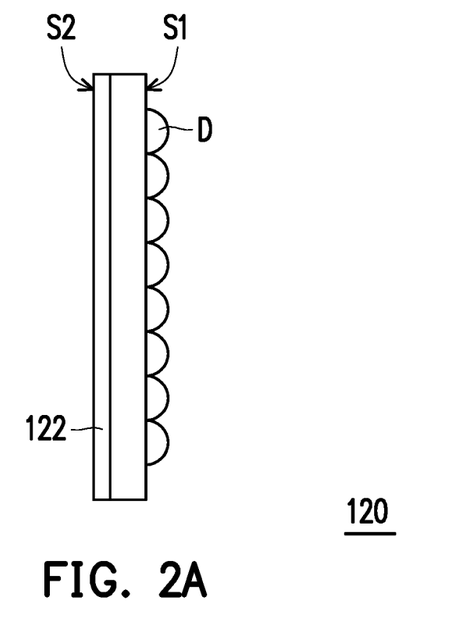
FIG. 2A and FIG. 2B are respectively a schematic side view and a perspective view of a composite unit in FIG. 1.
Figure 2B:
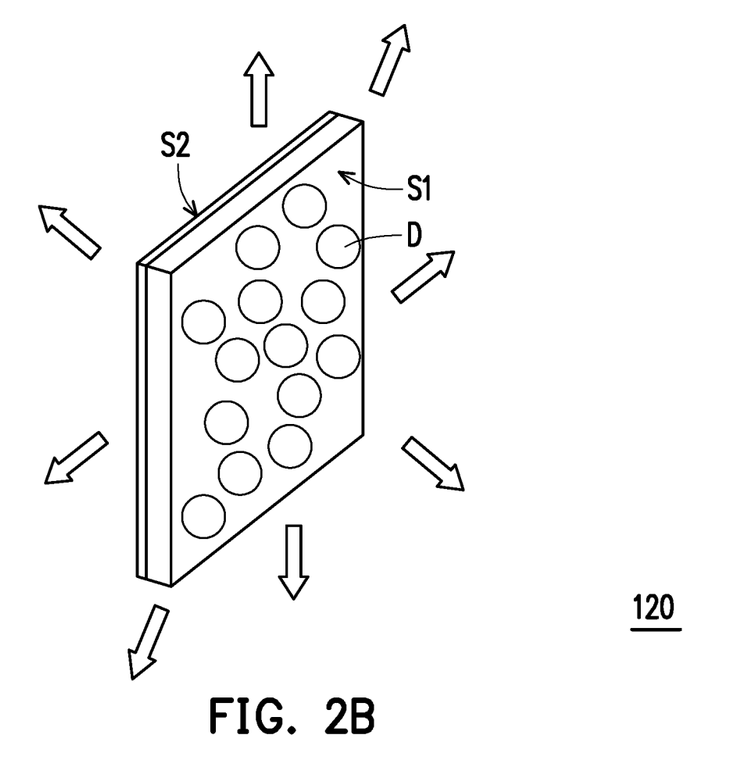

FIG. 2A and FIG. 2B are respectively a schematic side view and a perspective view of the composite unit in FIG. 1. Referring to FIG. 1 through FIG. 2B at the same time, the composite unit 120 is disposed on a transmission path of the light beam L and enables the light beam L to pass through. Specifically, in the present embodiment, the composite unit 120 includes a diffusion surface S1 and an optical surface S2 opposite to each other. In the present embodiment, the diffusion surface S1 has optical microstructures D, which protrude from the surface of the diffusion surface S1 and are non-array aligned, thereon for enabling the laser beam to pass through and producing a diffusion effect, so as to alleviate speckle phenomenon while prolonging the service life of the wavelength conversion device 140 described in the following. On the other hand, the optical surface S2 may selectively be disposed with an optical component or form a surface that changes optical properties. In the present embodiment, the optical surface S2 includes a beam splitting surface 122 for enabling the light beam L to pass through and reflecting the excited beam L6, but the invention is not limited thereto.

The wavelength conversion device 140 is, for example, a rotatable color wheel structure disposed on the transmission path of the excitation beam L1 for converting the excitation beam L1 into the excited beam L6 (which is a green light) and reflecting it back to the composite unit 120. In the present embodiment, the beam splitting surface 122 on the optical surface S2 of the composite unit 120 is configured to enable the excitation beam L1, the blue light beam L2 and the supplementary light beam L3 to pass through and reflect the excited beam L6 converted by the wavelength conversion device 140. Therefore, the illumination system 100, with the beam splitting effect of the optical surface S2 on the composite unit 120, can provide the excitation beam L1 to the composite unit 120 during a first time period and provide the blue light beam L2 and the supplementary light beam L3 to the composite unit 120 during a second time period, so as to provide the blue light beam L2, the supplementary light beam L3 and the excited beam L6 to the light valve 50 to serve as the illumination beam LB. Although the above embodiment is described with two different time periods, in other embodiments, the illumination system 100 may also provide the excitation beam L1 to the composite unit 120 and provide the blue light beam L2 and the supplementary light beam L3 to the composite unit 120 in a same time period.

It is worth mentioning that, the actuator 130 is connected to the composite unit 120 for driving the composite unit 120 to move along at least one direction, and the at least one direction is perpendicular to a normal direction of a plane on which the composite unit 120 is located. The actuator 130 is, for example, a motor, a piezoelectric motor or a voice coil motor (VCM), and thus can enable the composite unit 120 to perform vibration, periodic motion or non-periodic motion along a plurality of directions perpendicular to the normal direction of the plane on which it is located, but the invention is not limited thereto. In detail, when the light beam L passes through the composite unit 120, the motion of the composite unit 120 produces a diffusion effect on the excitation beam L1, the blue light beam L2 and the supplementary light beam L3 that pass through the diffusion surface S1. In this way, speckle phenomenon of the excitation beam L1, the blue light beam L2 and the supplementary light beam L3 can be reduced without additionally requiring a color wheel device, and thereby improves the optical quality while reducing the system volume and lowering the costs.

In addition, in the present embodiment, the optical surface S2 may further be disposed towards the wavelength conversion device 140. In other words, the optical surface S2 is located between the wavelength conversion device 140 and the diffusion surface S1. As a result, the excited beam L6 is directly transmitted onto the optical surface S2 to generate reflection, so as to avoid being reduced in light intensity of the excited beam L6 by passing through the diffusion surface S1, but the invention is not limited thereto. On the other hand, in the present embodiment, the actuator 130 may further be controlled by a signal to stop the motion during the first time period and to perform the motion during second time period. In the way, the excitation beam L1 can be prevented from being expanded due to an influence of the diffusion surface S1 of the composite unit 120 that is in motion and causing the speckle pattern to be enlarged to affect the light collection efficiency, and the invention is also not limited thereto.

Figure 3:
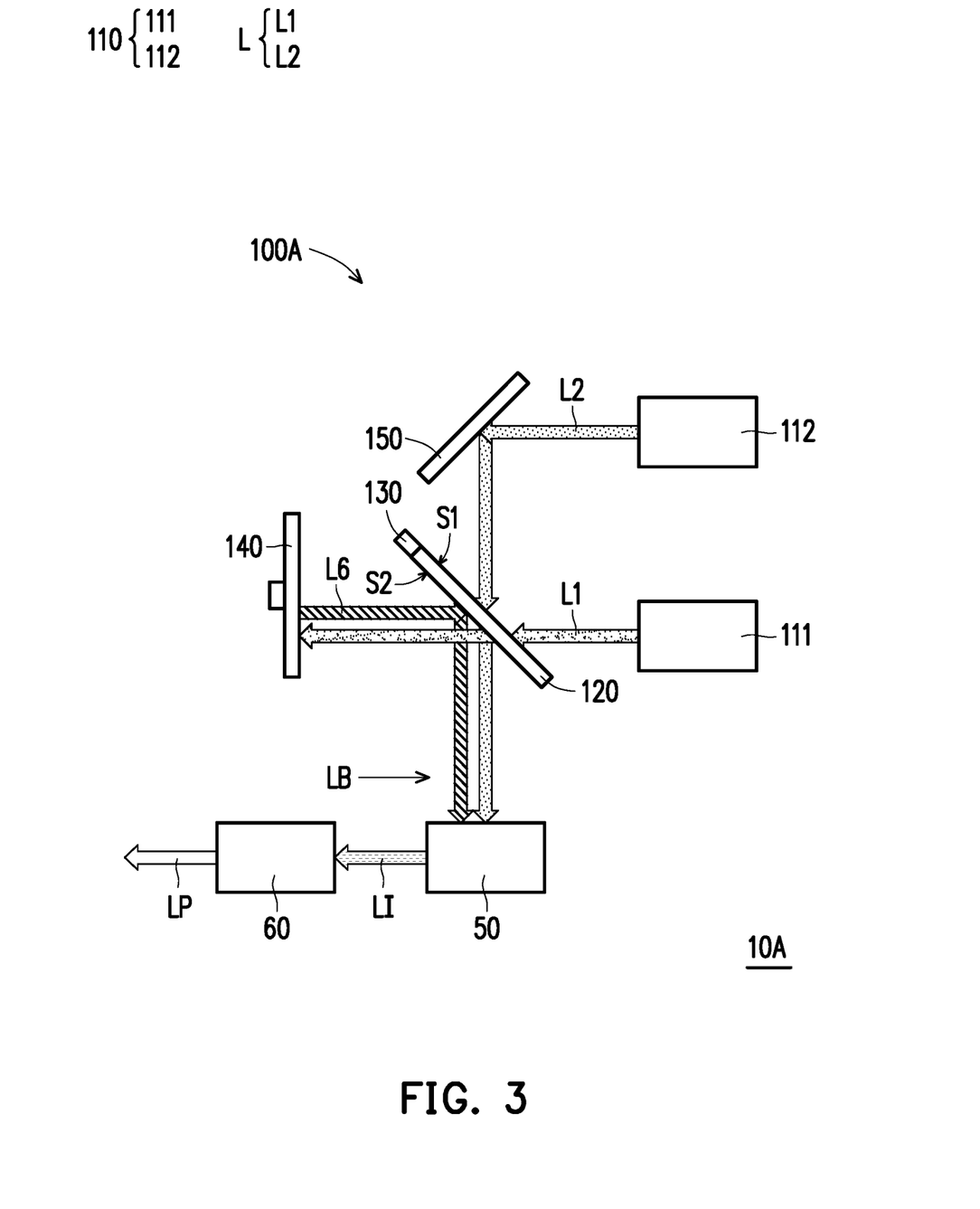
FIG. 3 is a schematic view illustrating a projection apparatus according to another embodiment of the invention.

FIG. 3 is a schematic view illustrating a projection apparatus according to another embodiment of the invention. Referring to FIG. 3, the projection apparatus 10A of the present embodiment is similar to the projection apparatus 10 of FIG. 1. Differences between the two lies in that, in the present embodiment, the light source 110 in an illumination system 100A omits the supplementary light source 113 of FIG. 1, and the wavelength conversion device 140 can convert the excitation beam L1 into an excited beam L6 having a yellow light. As a result, configuration such as the supplementary light source 113 of FIG. 1 can be spared to lower the costs and reduce the volume. At the same time, such a configuration can be applied to a projection apparatus including two light valves or three light valves, wherein teachings, suggestions and implementation instructions regarding detailed steps and embodiments thereof can be adequately acquired from the general knowledge in the art, and thus will not be described herein.

Figure 4:
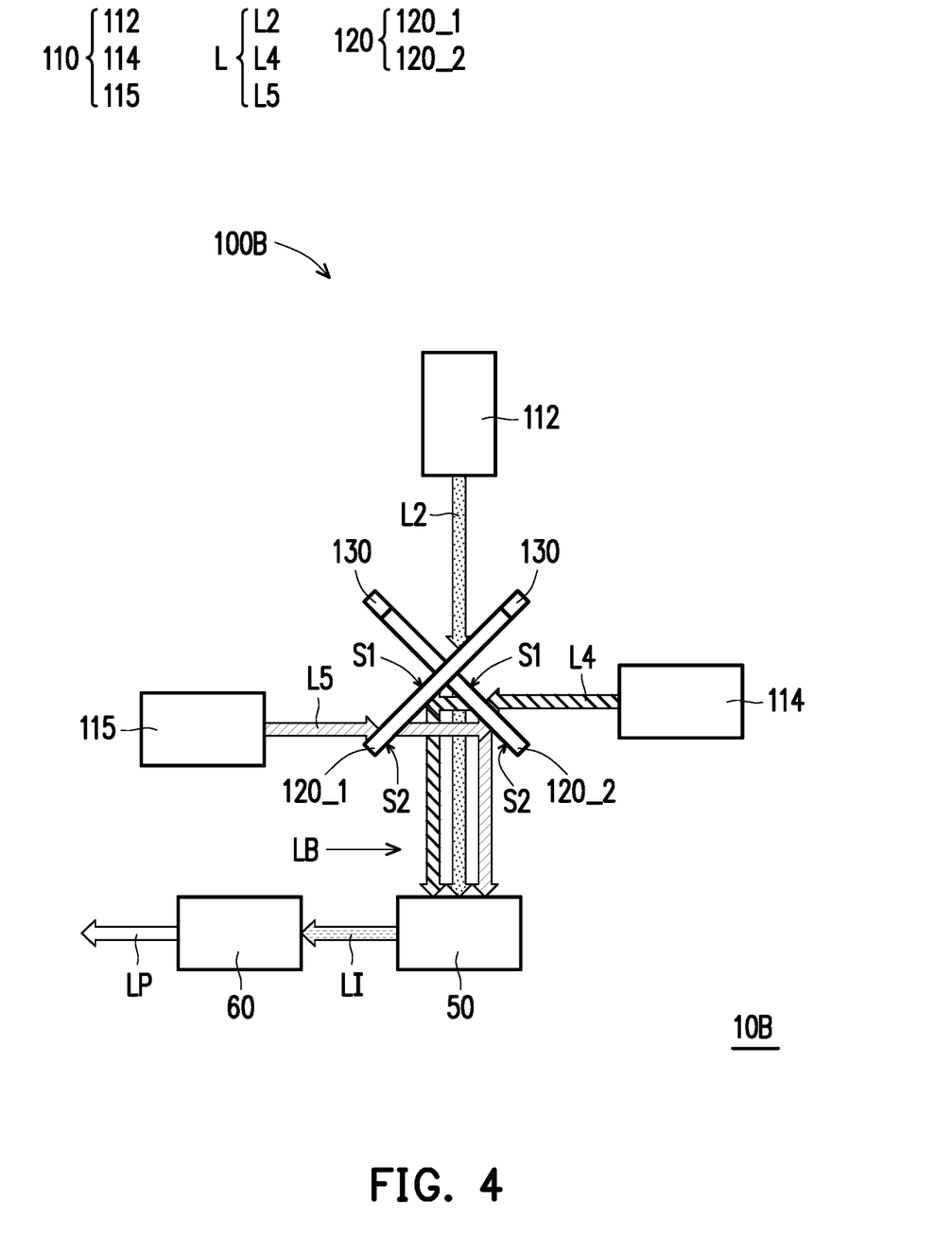
FIG. 4 is a schematic view illustrating a projection apparatus according to another embodiment of the invention.

FIG. 4 is a schematic view illustrating a projection apparatus according to another embodiment of the invention. Referring to FIG. 4, the projection apparatus 10B of the present embodiment is similar to the projection apparatus 10 of FIG. 1. A difference between the two lies in that, in the present embodiment, the light source 110 in an illumination system 100B includes the blue light source 112, a green light source 114 and a red light source 115. The blue light source 112 is configured to provide the blue light beam L2, the green light source 114 is configured to provide a green light beam L4, and the red light source 115 is configured to provide a red light beam L5. Moreover, in the present embodiment, the composite unit 120 further includes a first composite unit 120_1 and a second composite unit 120_2 of which optical surfaces S2 respectively include different beam splitting surfaces.

Specifically, in the present embodiment, the beam splitting surface of the first composite unit 120_1 is configured to enable the blue light beam L2 and the red light beam L5 to pass through and reflect the green light beam L4, and the beam splitting surface in the second composite unit 120_2 is configured to enable the blue light beam L2 and the green light beam L4 to pass through and reflect the red light beam L5. Thus, the blue light beam L2, the green light beam L4 and the red light beam L5 can be provided to the light valve 50 at the same time to serve as the illumination beam LB. Moreover, the diffusion surfaces S1 of the first composite unit 120_1 and the second composite unit 120_2 are respective located between the light source 110 and the corresponding beam splitting surface, so when the first composite unit 120_1 and the second composite unit 120_2 each moves along a direction perpendicular to a normal direction of a plane on which it is located by means of a different or same actuator 130, diffusion effects on the blue light beam L2, the green light beam L4 and the red light beam L5 are produced. In this way, configuration such as the wavelength conversion device 140 and the beam splitters 150 in the embodiment of FIG. 1 can be omitted, and at the same time, speckle phenomenon of the blue light beam L2, the green light beam L4 and the red light beam L5 can be reduced by the composite unit 120 without additionally requiring a color wheel device, thereby improving the optical quality while reducing the system volume and lowering the costs.

Figure 5:
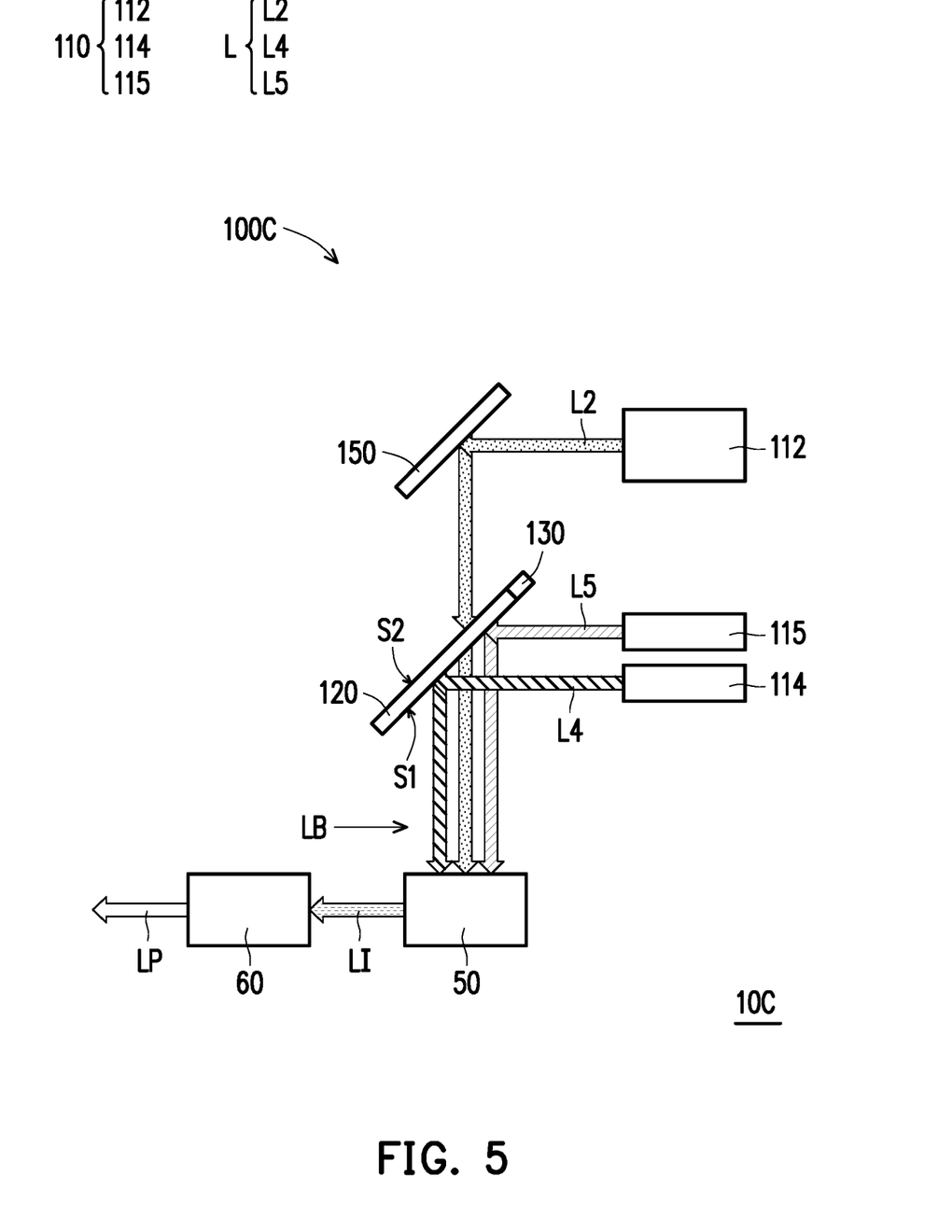
FIG. 5 is a schematic view illustrating a projection apparatus according to another embodiment of the invention.

FIG. 5 is a schematic view illustrating a projection apparatus according to another embodiment of the invention. Referring to FIG. 5, the projection apparatus 10C of the present embodiment is similar to the projection apparatus 10 of FIG. 1. A difference between the two lies in that, in the present embodiment, the light source 100 in an illumination system 100C includes the blue light source 112, the green light source 114 and the red light source 115. The blue light source 112 is configured to provide the blue light beam L2, the green light source 114 is configured to provide a green light beam L4, and the red light source 115 is configured to provide a red light beam L5. In the present embodiment, the composite unit 120 is disposed on transmission paths of the blue light beam L2, the green light beam L4 and the red light beam L5, and the beam splitting surface of the composite unit 120 is configured to reflect the green light beam L4 and the red light beam L5 and enable the blue light beam L2 to pass through. At the same time, through the actuation the actuator 130, diffusion effects of the blue light beam L2, the green light beam L4 and the red light beam L5 are produced at the diffusion surface S1 of the composite unit 120. As a result, configuration such as the wavelength conversion device 140 in the embodiment of FIG. 1 can be omitted, and at the same time, speckle phenomenon of the blue light beam L2, the green light beam L4 and the red light beam L5 can be reduced by the composite unit 120 without additionally requiring a color wheel device, thereby improving the optical quality while reducing the system volume and lowering the costs.

Figure 6:
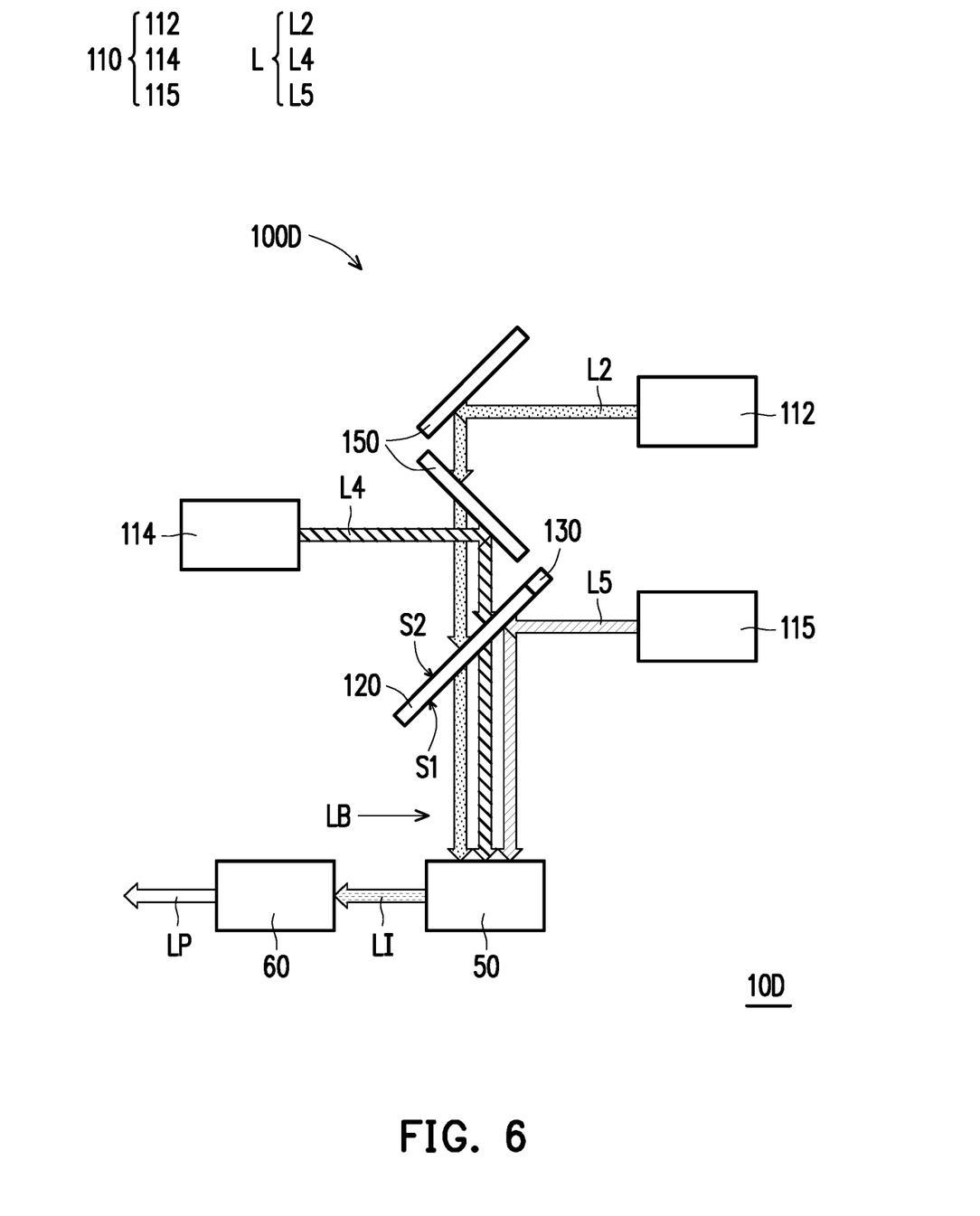
FIG. 6 is a schematic view illustrating a projection apparatus according to another embodiment of the invention.

FIG. 6 is a schematic view illustrating a projection apparatus according to another embodiment of the invention. Referring to FIG. 6, the projection apparatus 10D of the present embodiment is similar to the projection apparatus 10C of FIG. 5. A difference between the two lies in that, in the present embodiment, an illumination system 100D may further be added with one more beam splitter 150, which is configured on a transmission path of the green light beam L4 for reflecting the green light beam L4 and enabling the blue light beam L2 to pass through. In this way, the light source 110 can have more different configurations.

Figure 7A:
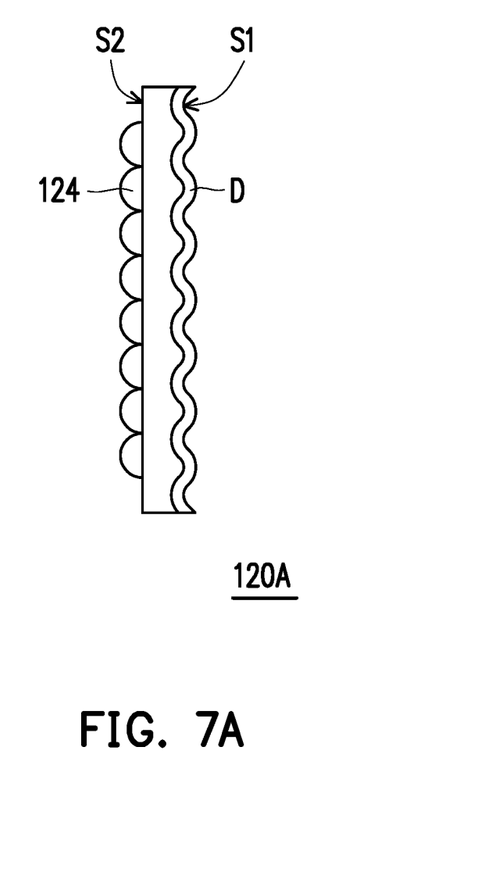
FIG. 7A and FIG. 7B are respectively schematic side views of a composite unit according to different embodiments.
Figure 7B:
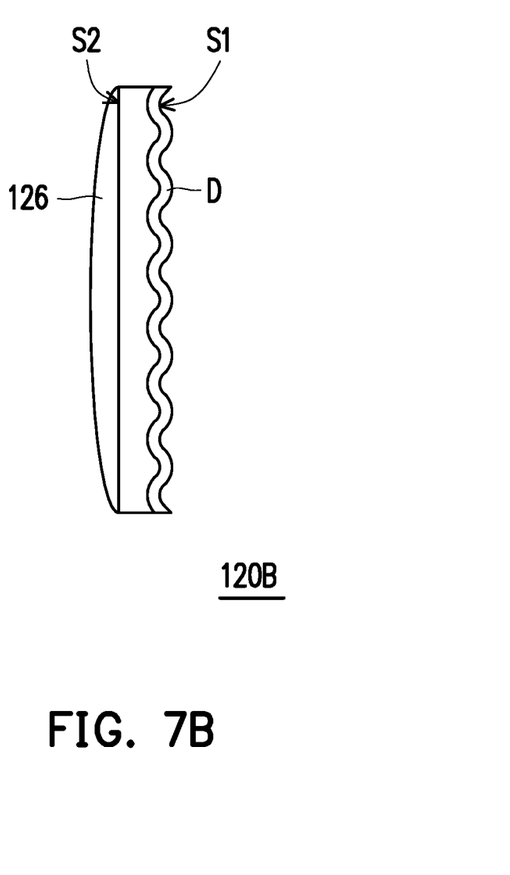
Figure 8:
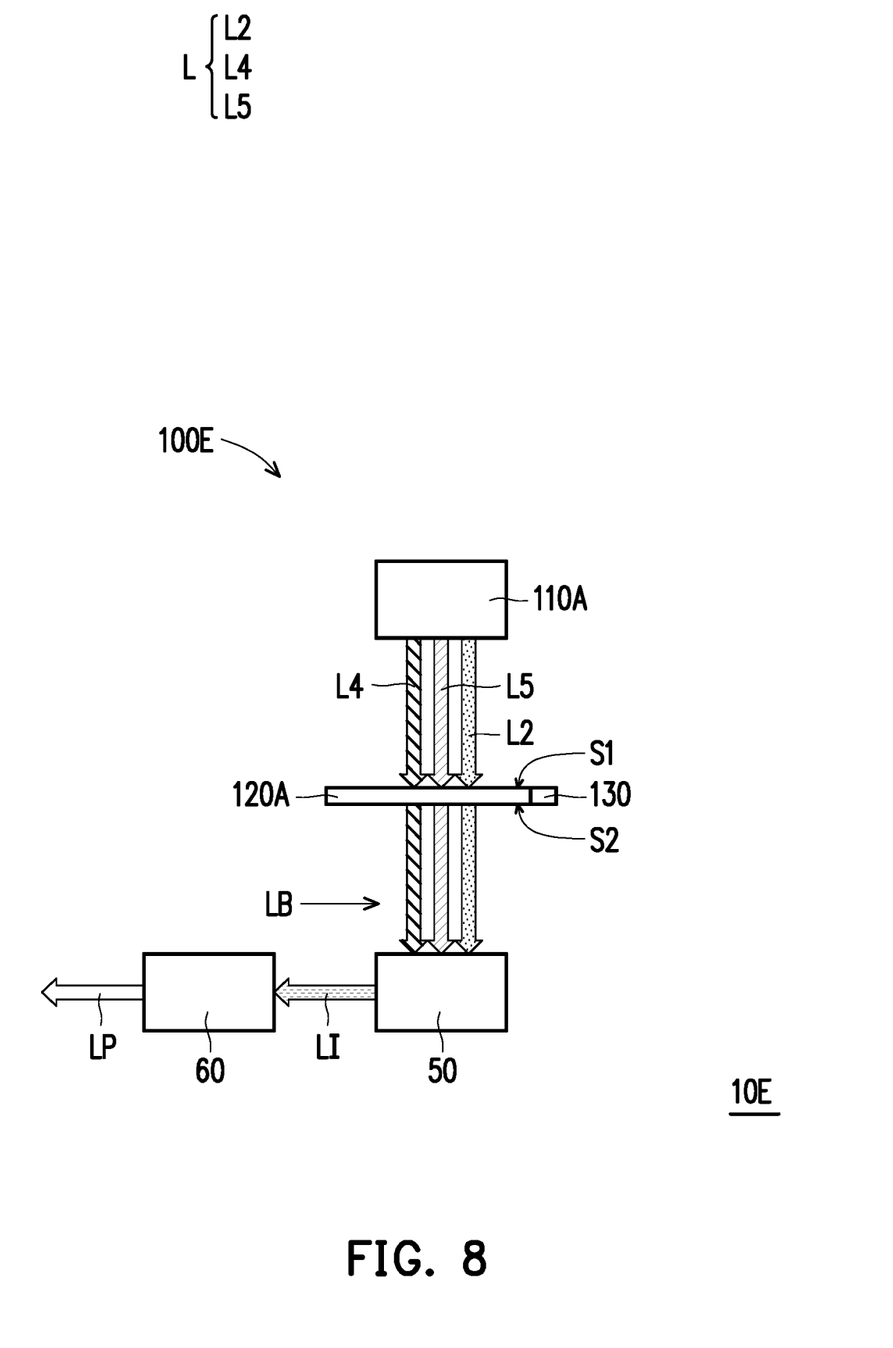
FIG. 8 is a schematic view illustrating a projection apparatus according to another embodiment of the invention.

FIG. 7A and FIG. 7B are respectively schematic side views of a composite unit according to different embodiments. FIG. 8 is a schematic view illustrating a projection apparatus according to another embodiment of the invention. Referring first to FIG. 7A and FIG. 8, the projection apparatus 10E of the present embodiment is similar to the projection apparatus 10C of FIG. 5. Differences between the two lies in that, in the present embodiment, a light source 110A of an illumination system 100E is an RGB laser bank configured to provide the blue light beam L2, the green light beam L4 and the red light beam L5. A composite unit 120A is adopted and the beam splitter 150 is omitted.

In detail, the composite unit 120A is disposed on a transmission paths of the blue light beam L2, the green light beam L4 and the red light beam L5, wherein a diffusion surface S1 of the composite unit 120A is non-surface protruding optical microstructures D, and an optical surface S2 of the composite unit 120A is a fly-eye lens 124. Thus, energy distribution of the light beams can be adjusted by further using the optical surface S2 to adjust speckle patterns of the blue light beam L2, the green light beam L4 and the red light beam L5. At the same time, through the actuation of the actuator 130, diffusion effects of the blue light beam L2, the green light beam L4 and the red light beam L5 are produced at the diffusion surface S1 of the composite unit 120A. As a result, speckle phenomenon of the blue light beam L2, the green light beam L4 and the red light beam L5 can be reduced by the composite unit 120A without additionally requiring a color wheel device, thereby improving the optical quality while reducing the system volume and lowering the costs.

Figure 9:
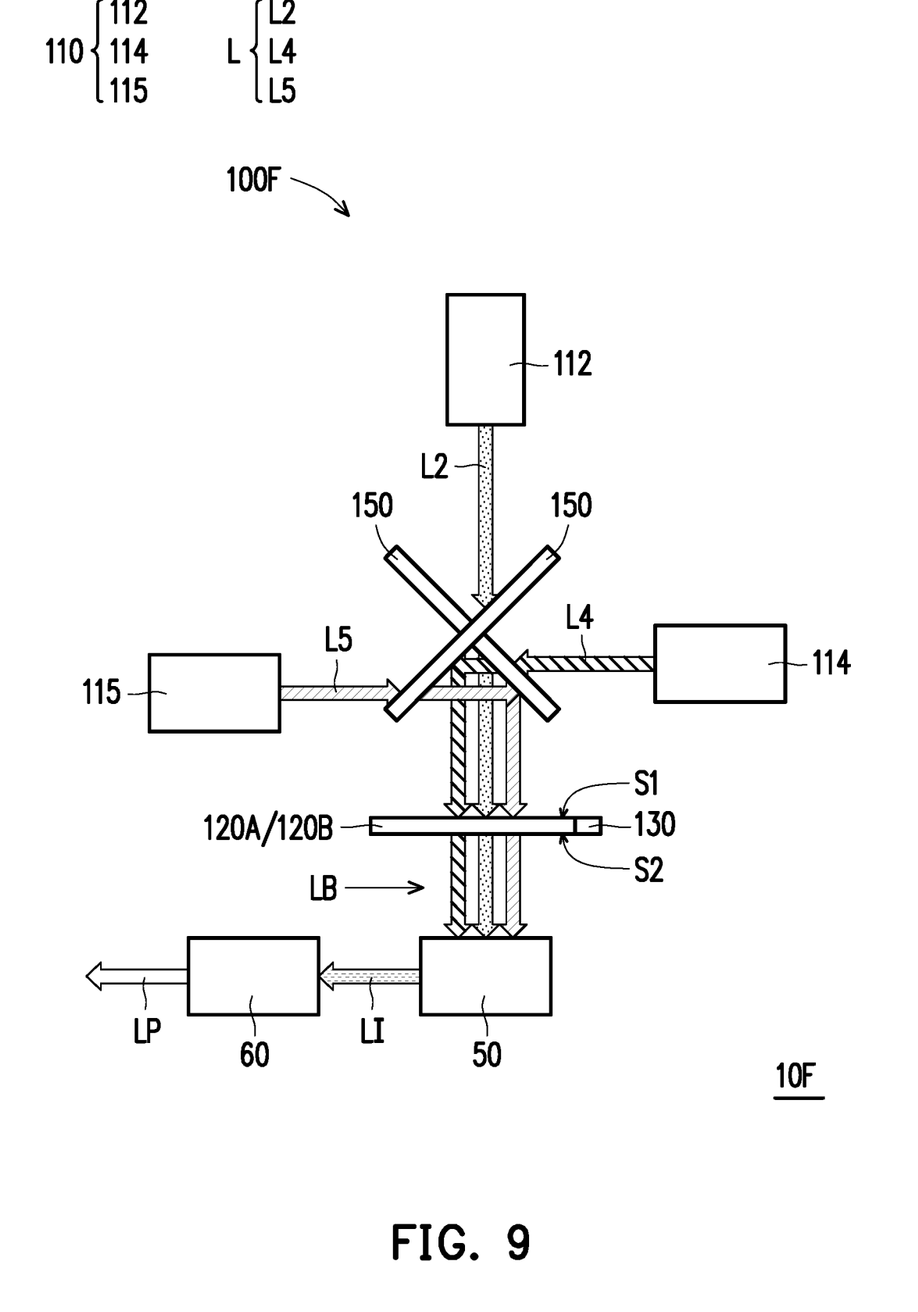
FIG. 9 is a schematic view illustrating a projection apparatus according to another embodiment of the invention.

FIG. 9 is a schematic view illustrating a projection apparatus according to another embodiment of the invention. Referring to FIG. 7B and FIG. 9, the projection apparatus 10F of the present embodiment is similar to the projection apparatus 10B of FIG. 4. A difference between the two lies in that, in the present embodiment, an illumination system 100F adopts two beam splitters 150 to replace the first composite unit 120_1 and the second composite unit 120_2 in the embodiment of FIG. 4. In the present embodiment, a composite unit 120B is disposed between the two beam splitters 150 and the light valve 50. In detail, the composite unit 120B is disposed on transmission paths of the blue light beam L2, the green light beam L4 and the red light beam L5, wherein a diffusion surface S1 of the composite unit 120B is non-surface protruding optical microstructures D, and an optical surface S2 of the composite unit 120B is an optical lens 126, such as a spherical lens or an aspherical lens. Therefore, energy distribution of the light beams can be adjusted by further using the optical surface S2 to adjust the transmission paths and focal lengths of the blue light beam L2, the green light beam L4 and the red light beam L5.

At the same time, through the actuation of the actuator 130, diffusion effects of the blue light beam L2, the green light beam L4 and the red light beam L5 are produced at the diffusion surface S1 of the composite unit 120B. As a result, speckle phenomenon of the blue light beam L2, the green light beam L4 and the red light beam L5 can be reduced by the composite unit 120B without additionally requiring a color wheel device, thereby improving the optical quality while reducing the system volume and lowering the costs. In other embodiments, speckle patterns of the blue light beam L2, the green light beam L4 and the red light beam L5 may also be adjusted by using the composite unit 120A from the embodiment of FIG. 7A, and the invention is not limited thereto.

Figure 10:
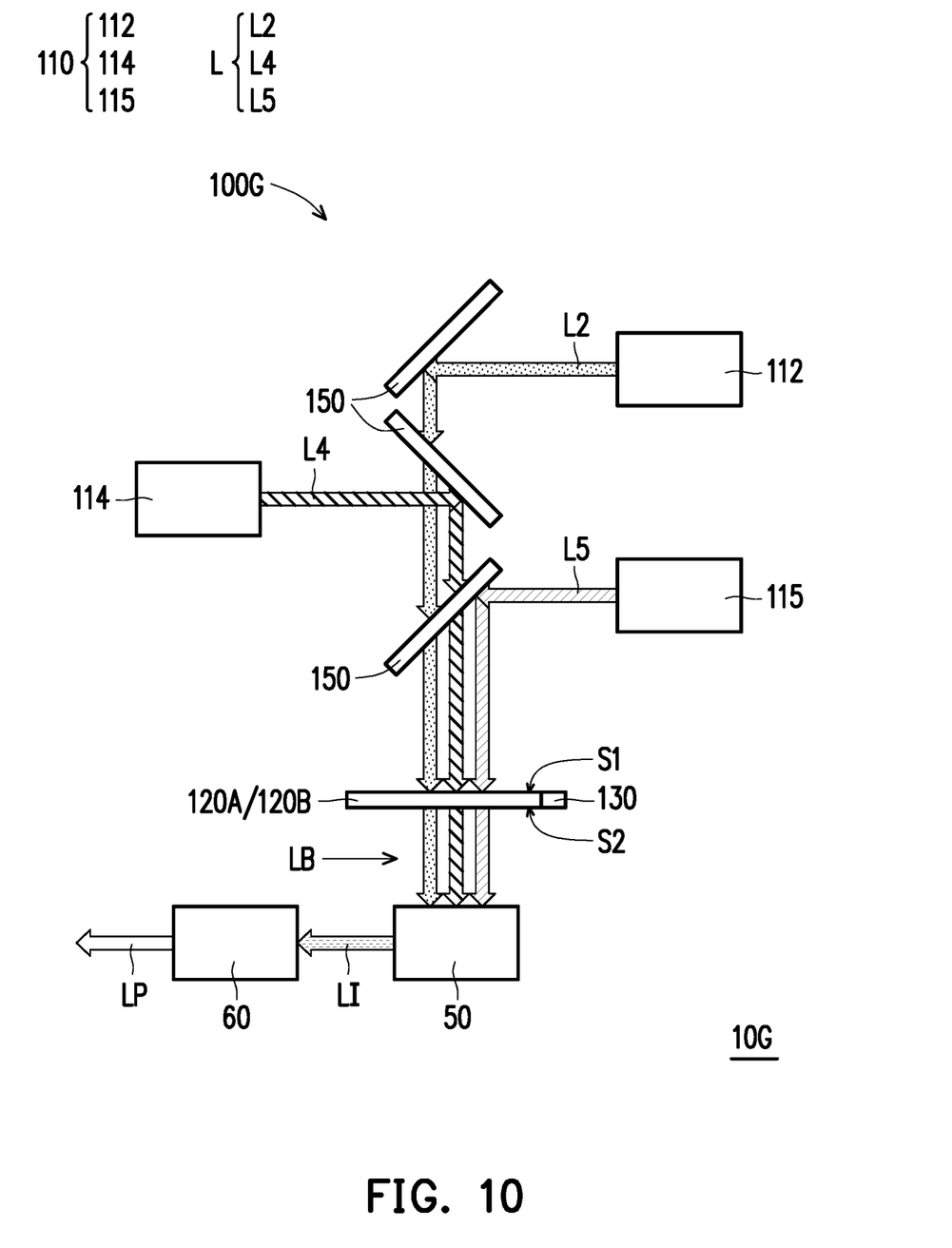
FIG. 10 is a schematic view illustrating a projection apparatus according to another embodiment of the invention.

FIG. 10 is a schematic view illustrating a projection apparatus according to another embodiment of the invention. Referring to FIG. 10, the projection apparatus 10G of the present embodiment is similar to the projection apparatus 10D of FIG. 6. A difference between the two lies in that, in the present embodiment, an illumination system 100G replaces the composite unit 120 in the embodiment of FIG. 6 with a beam splitter 150. In the present embodiment, the illumination system 100G may selectively be configured with the composite unit 120A from the embodiment of FIG. 7A or the composite unit 120B from the embodiment of FIG. 7B at a position between the beam splitters 150 and the light valve 50. In this way, diffusion effects of the blue light beam L2, the green light beam L4 and the red light beam L5 can be produced at the diffusion surface S1 of the composite unit 120B via the actuation of the actuator 130. As a result, by using the composite unit 120A or the composite unit 120B, energy distributions of the light beams or transmission paths and focal lengths of the light beams can be adjusted, and at the same time, speckle phenomenon of the blue light beam L2, the green light beam L4 and the red light beam L5 can be reduced without additionally requiring a color wheel device, thus improving the optical quality while reducing the system volume and lowering the costs.

Figure 11:
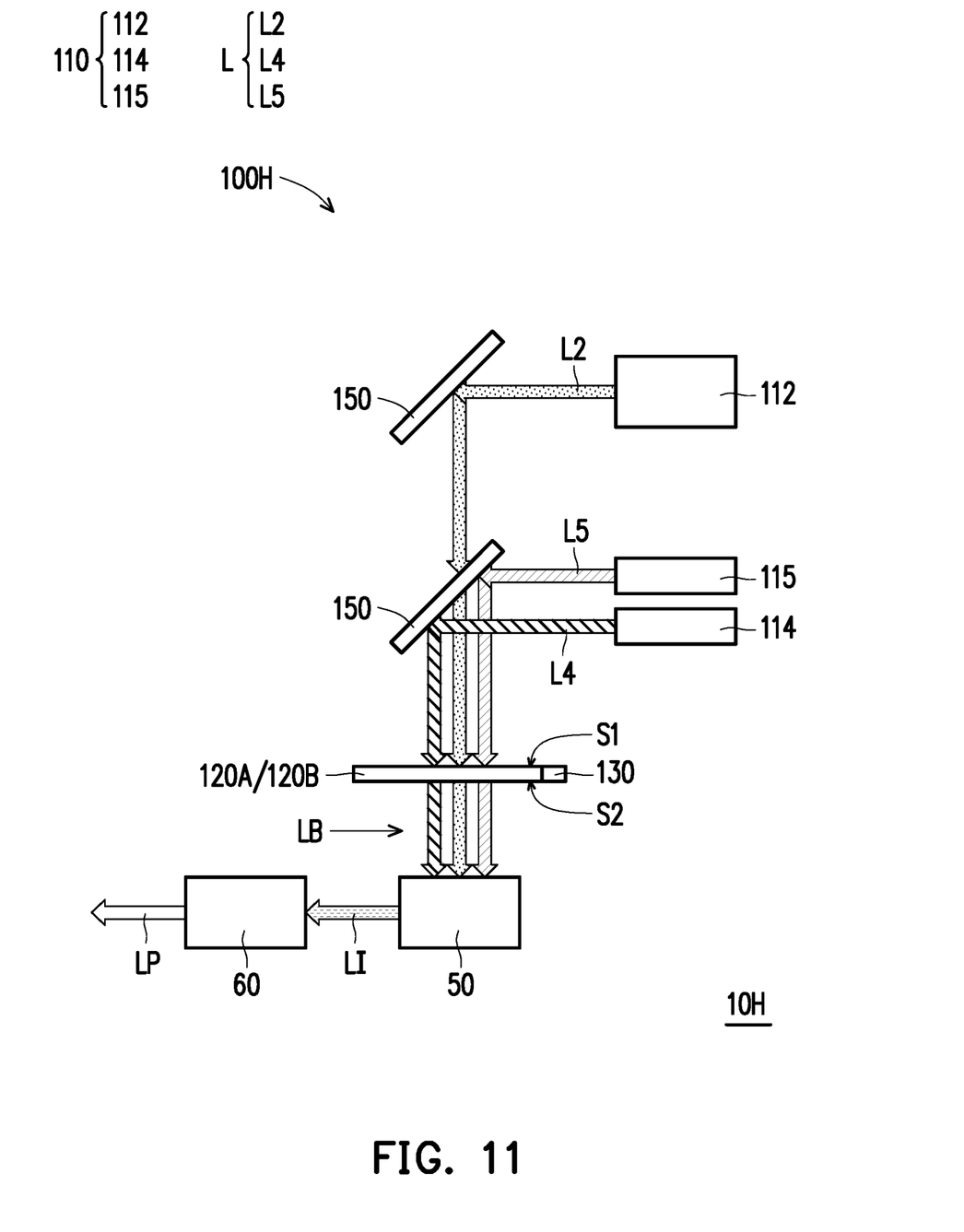
FIG. 11 is a schematic view illustrating a projection apparatus according to another embodiment of the invention.

FIG. 11 is a schematic view illustrating a projection apparatus according to another embodiment of the invention. Referring to FIG. 11, the projection apparatus 10H of the present embodiment is similar to the projection apparatus 10C of FIG. 5. A difference between the two lies in that, in the present embodiment, an illumination system 100H replaces the composite unit 120 in the embodiment of FIG. 5 with a beam splitter 150. In the present embodiment, the illumination system 100H may selectively be configured with the composite unit 120A from the embodiment of FIG. 7A or the composite unit 120B from the embodiment of FIG. 7B at a position between the beam splitters 150 and the light valve 50. In this way, diffusion effects of the blue light beam L2, the green light beam L4 and the red light beam L5 can be produced at the diffusion surface S1 of the composite unit 120B via the actuation of the actuator 130. As a result, by using the composite unit 120A or the composite unit 120B, energy distributions of the light beams or transmission paths and focal lengths of the light beams can be adjusted, and at the same time, speckle phenomenon of the blue light beam L2, the green light beam L4 and the red light beam L5 can be reduced without additionally requiring a color wheel device, thus improving the optical quality while reducing the system volume and lowering the costs.

Based on the above, the embodiments of the invention achieve at least one of the following advantages or effects. In the projection apparatus of the invention, the composite unit of the illumination system is disposed on the transmission paths of the light beams, and through the actuation of the actuator, the diffusion effects of the light beams are produced at the diffusion surface of the composite unit. As a result, the speckle phenomenon of the light beams can be reduced by the composite unit without additionally requiring a color wheel device, thereby improving the optical quality while reducing the system volume and lowering the costs.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination beam, the illumination system comprising at least one light source, a composite unit and an actuator, wherein:
 the at least one light source is configured to provide at least one light beam;
 the composite unit comprises a diffusion surface and an optical surface opposite to each other, wherein the composite unit is disposed on a transmission path of the at least one light beam and configured to enable the at least one light beam to pass through; and
 the actuator is connected to the composite unit for driving the composite unit to move along at least one direction, and the at least one direction is perpendicular to a normal direction of a plane on which the composite unit is located,
 wherein the at least one light source comprises an excitation light source and a blue light source, the excitation light source is configured to provide an excitation beam, the blue light source is configured to provide a blue light beam, and the illumination system further comprises:
 a wavelength conversion device, disposed on a transmission path of the excitation beam and configured to convert the excitation beam into an excited beam, wherein the optical surface is a beam splitting surface configured to enable the excitation beam and the blue light beam to pass through and to reflect the excited beam, and the optical surface is located between the wavelength conversion device and the diffusion surface.

2. The illumination system as recited in claim 1, wherein a motion of the composite unit comprises vibration.

3. The illumination system as recited in claim 1, wherein the at least one light source further comprises a supplementary light source configured to provide a supplementary light beam, and the composite unit is configured to enable the supplementary light beam to pass through.

4. The illumination system as recited in claim 1, wherein during a first time period, the excitation light source provides the excitation beam to the composite unit, during a second time period, the blue light source provides the blue light beam to the composite unit, and the composite unit stops a motion thereof during first time period and performs the motion during the second time period by means of the actuator.

5. The illumination system as recited in claim 1, wherein the at least one light source further comprises a red light source, the red light source is configured to provide a red light beam, the optical surface is a beam splitting surface, and the diffusion surface is located between the at least one light source and the beam splitting surface.

6. The illumination system as recited in claim 1, further comprising:
 at least one beam splitter, disposed on the transmission path of the at least one light beam between the at least one light source and the composite unit, wherein the at least one light source further comprises a red light source, and the red light source is configured to provide a red light beam.

7. An illumination system, configured to provide an illumination beam, the illumination system comprising at least one light source, a composite unit and an actuator, wherein:
 the at least one light source is configured to provide at least one light beam;
 the composite unit comprises a diffusion surface and an optical surface opposite to each other, wherein the composite unit is disposed on a transmission path of the at least one light beam and configured to enable the at least one light beam to pass through; and
 the actuator is connected to the composite unit for driving the composite unit to move along at least one direction, and the at least one direction is perpendicular to a normal direction of a plane on which the composite unit is located,
 wherein the optical surface is a fly-eye lens.

8. An illumination system, configured to provide an illumination beam, the illumination system comprising at least one light source, a composite unit and an actuator, wherein:
 the at least one light source is configured to provide at least one light beam;
 the composite unit comprises a diffusion surface and an optical surface opposite to each other, wherein the composite unit is disposed on a transmission path of the at least one light beam and configured to enable the at least one light beam to pass through; and
 the actuator is connected to the composite unit for driving the composite unit to move along at least one direction, and the at least one direction is perpendicular to a normal direction of a plane on which the composite unit is located,
 at least one beam splitter is separated from the diffusion surface of the composite unit, and is disposed on the transmission path of the at least one light beam between the at least one light source and the composite unit,
 wherein the diffusion surface faces toward the at least one light source and the at least one beam splitter, the diffuser surface is located between the optical surface and the at least one light source,
 wherein the optical surface is a spherical lens or an aspherical lens, and faces away from the at least one light source.

9. A projection apparatus, configured to provide a projection beam, the projection apparatus comprising an illumination system, at least one light valve and a lens module, wherein:
 the illumination system provides an illumination beam and comprises at least one light source, a composite unit and an actuator, wherein:
 the at least one light source is configured to provide at least one light beam;
 the composite unit comprises a diffusion surface and an optical surface opposite to each other, and is disposed on a transmission path of the at least one light beam and configured to enable the at least one light beam to pass through; and
 the actuator is connected to the composite unit;
 the at least one light valve is disposed on a transmission path of the illumination beam for converting the illumination beam into at least one image beam; and
 the lens module is disposed on a transmission path of the at least one image beam for converting the at least one image beam into a projection beam, wherein the actuator is configured to drive the composite unit to move along at least one direction, and the at least one direction is perpendicular to a normal direction of a plane on which the composite unit is located, wherein the at least one light source comprises an excitation light source and a blue light source, the excitation light source is configured to provide an excitation beam, the blue light source is configured to provide a blue light beam, and the illumination system further comprises a wavelength conversion device disposed on a transmission path of the excitation beam and configured to convert the excitation beam into an excited beam, wherein the optical surface is a beam splitting surface configured to enable the excitation beam and the blue light beam to pass through and to reflect the excited beam, and the optical surface is located between the wavelength conversion device and the diffusion surface.

10. The projection apparatus as recited in claim 9, wherein a motion of the composite unit includes vibration.

11. The projection apparatus as recited in claim 9, wherein the at least one light source further comprises a supplementary light source configured to provide a supplementary light beam, and the composite unit is configured to enable the supplementary light beam to pass through.

12. The projection apparatus as recited in claim 9, wherein during a first time period, the excitation light source provides the excitation beam to the composite unit, during a second time period, the blue light source provides the blue light beam to the composite unit, and the composite unit stops a motion thereof during first time period and performs the motion during the second time period by means of the actuator.

13. The projection apparatus as recited in claim 9, wherein the at least one light source further comprises a red light source, the red light source is configured to provide a red light beam, the optical surface is a beam splitting surface, and the diffusion surface is located between the at least one light source and the optical surface.

14. The projection apparatus as recited in claim 9, wherein the illumination system further comprises at least one beam splitter disposed on the transmission path of the at least one light beam between the at least one light source and the composite unit, wherein the at least one light source further comprises a red light source, and the red light source is configured to provide a red light beam.

15. A projection apparatus, configured to provide a projection beam, the projection apparatus comprising an illumination system, at least one light valve and a lens module, wherein:

the illumination system provides an illumination beam and comprises at least one light source, a composite unit and an actuator, wherein:

the at least one light source is configured to provide at least one light beam;

the composite unit comprises a diffusion surface and an optical surface opposite to each other, and is disposed on a transmission path of the at least one light beam and configured to enable the at least one light beam to pass through; and the actuator is connected to the composite unit;

the at least one light valve is disposed on a transmission path of the illumination beam for converting the illumination beam into at least one image beam; and the lens module is disposed on a transmission path of the at least one image beam for converting the at least one image beam into a projection beam, wherein the actuator is configured to drive the composite unit to move along at least one direction, and the at least one direction is perpendicular to a normal direction of a plane on which the composite unit is located, wherein the optical surface includes a fly-eye lens.

16. A projection apparatus, configured to provide a projection beam, the projection apparatus comprising an illumination system, at least one light valve and a lens module, wherein:

the illumination system provides an illumination beam and comprises at least one light source, a composite unit and an actuator, wherein:

the at least one light source is configured to provide at least one light beam;

the composite unit comprises a diffusion surface and an optical surface opposite to each other, and is disposed on a transmission path of the at least one light beam and configured to enable the at least one light beam to pass through; and the actuator is connected to the composite unit;

the at least one light valve is disposed on a transmission path of the illumination beam for converting the illumination beam into at least one image beam; and the lens module is disposed on a transmission path of the at least one image beam for converting the at least one image beam into a projection beam, wherein the actuator is configured to drive the composite unit to move along at least one direction, and the at least one direction is perpendicular to a normal direction of a plane on which the composite unit is located, at least one beam splitter is separated from the diffusion surface of the composite unit, and is disposed on the transmission path of the at least one light beam between the at least one light source and the composite unit, wherein the diffusion surface faces toward the at least one light source and the at least one beam splitter, the diffuser surface is located between the optical surface and the at least one light source, wherein the optical surface includes a spherical lens or an aspherical lens, and faces away from the at least one light source.

* * * * *

UNITED STATES PATENT AND TRADEMARK OFFICE
CERTIFICATE OF CORRECTION

PATENT NO. : 11,243,407 B2
APPLICATION NO. : 16/701165
DATED : February 8, 2022
INVENTOR(S) : Yu-Shan Chen et al.

It is certified that error appears in the above-identified patent and that said Letters Patent is hereby corrected as shown below:

On the Title Page

Column 1, Item (30) Foreign Application Priority Data should read:
Dec. 13, 2018 (CN) .......... 201822089144.5

Signed and Sealed this
Third Day of May, 2022

Katherine Kelly Vidal
*Director of the United States Patent and Trademark Office*